Nov. 10, 1964  E. N. CONNOY ETAL  3,156,077
DIAMOND EDGE SAW BLADE
Filed Feb. 6, 1963
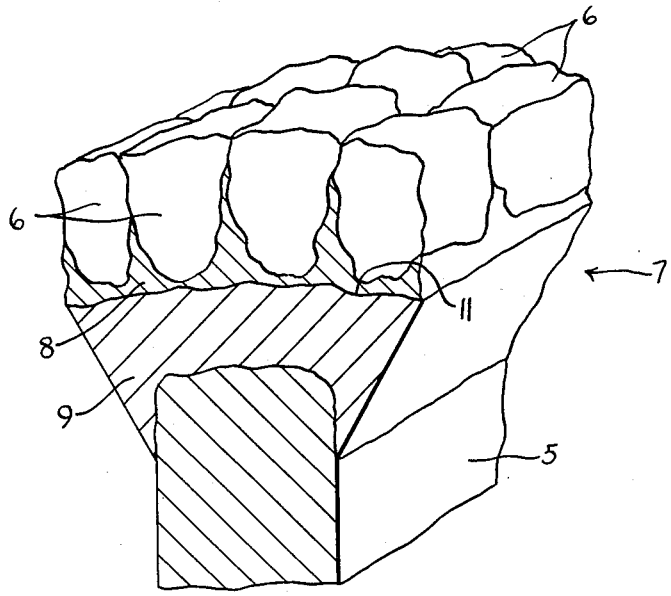
Inventors
Eugene N. Connoy
Robert J. Wilkie
By Ira Milton Jones
Attorney

3,156,077
DIAMOND EDGE SAW BLADE
Eugene N. Connoy and Robert J. Wilkie, Minneapolis, Minn., assignors to Continental Machines, Inc., Savage, Minn., a corporation of Minnesota
Filed Feb. 6, 1963, Ser. No. 256,715
3 Claims. (Cl. 51—395)

This invention relates to cutting tools and refers more particularly to diamond edged saw blades. The invention is, therefore, classifiable with the Barron Patents Nos. 2,784,536 and 2,924,050.

The purpose and object of this invention is to provide an improved diamond edged saw blade.

Another object of this invention is to provide a diamond edged saw blade for band saws which has greater resistance to fatigue failure than blades of this type heretofore available.

Heretofore it was believed desirable, and in fact necessary—as evidenced by the aforesaid Barron patents—to have diamond grit covering at least a part of the sides or faces of the blade as well as its leading edge. While such blades did produce a relatively smooth surfaced cut or kerf without binding, it was found that blades with diamonds on their sides or faces had noticeably poor resistance to fatigue failure. To learn why this was so, tests were conducted with plain uncoated steel bands, steel bands with plated edge portions but no diamonds, and with steel bands having diamond grit bonded to the sides or faces. In all cases the bands were trained over 16" diameter wheels and were run at 5000 s.f.p.m. From these tests the following data was derived:

(1) The fatigue life of a plain spring tempered steel band ¾" wide and .020" thick is in excess of 400 hours. The band tested did not break; the test was terminated at this point since 400 hours is far beyond requirements.

(2) Two separate bands of the same spring tempered steel used for Test No. 1 had diamond grit bonded to their leading edges and adjacent marginal portions of their sides or faces, the diamonds being embedded in metal plated onto the bands. Both of these bands broke when run fifteen and one-half (15½) hours. One band broke near the weld area, the break in the other was not near the weld.

(3) Another band of the same material (used in Test No. 1) was electroplated with the same procedure used in the production of the two diamond-bearing bands of Test No. 2, but no diamonds were embedded in the plating. This band ran 109.7 hours and then broke directly at the weld. No other evidence of fatigue was noted.

Close examination of saw blades like those used to make the bands for Test No. 2, that is, blades with diamond grit on the sides or faces of the band, showed that many of the diamonds were in actual physical contact with the steel band. This physical contact or engagement between the diamonds and the steel band undoubtedly can be a source of trouble, since the continual abrasion of the steel by the diamonds which inevitably occurs as the band flexes in travelling around the pulleys, will produce stress risers at these points, and of course such stress risers lead to premature fatigue failure.

But whatever the answer may be for the early fatigue failures of the diamond-edged saw blades heretofore available, this invention has overcome the difficulty, since band saws made in accordance therewith have far greater resistance to fatigue. To illustrate, a band made of the same spring tempered steel used for Test No. 1, but with the diamonds applied in accordance with this invention, has been run on the same 16" diameter wheels for 118 hours at 5000 s.f.p.m., with no sign of fatigue.

The blade or band of this invention distinguishes from diamond edged saw bands heretofore available in three vital respects:

(1) The leading edge of the steel band has a bead of nickel cobalt plated thereon, which is substantially trapezoidal in cross section with the base of the trapezoid wider than the band thickness and forming the leading edge of the band.

(2) The diamond particles are embedded only in the base portion of this trapezoidal bead, that is, in its outer portion.

(3) A substantial cushioning or buffer zone of electro-deposited metal lies between the diamonds and the spring tempered steel, to preclude any physical contact therebetween.

The accompanying drawing illustrates one embodiment of this invention. In it the single figure is a cross sectional view on a greatly enlarged scale, through the cutting edge portion of the saw band or blade of this invention, said view being a reproduction of an actual photomicrograph.

Referring to the drawing, the numeral 5 designates a band or strip of spring tempered steel of the type used as the backing of band saw blades. For purposes of illustration, this strip or band may be twenty-thousandths of an inch (.020") thick, and three-quarters of an inch (¾") wide. It is of uniform thickness, at least to the extent that uniformity can be assured in production, and of course its opposite edges desirably are parallel.

One edge of the band 5 which, in use, is its leading edge, has diamond particles 6, usually referred to as diamond grit or bort, bonded thereto by being embedded in an electro-deposited bead, indicated generally by the numeral 7. The bead 7 is generally trapezoidal in cross section with the base of the trapezoid outermost, i.e. forming the actual leading edge of the blade. It consists of two superimposed zones or portions, the outer one of which, designated by the numeral 8, has the diamond particles 6 embedded therein; and the other, designated by the numeral 9, constitutes a cushion or buffer between the diamonds and the steel band or strip.

Both zones are essentially nickel or nickel cobalt, and are formed by electroplating. Hence, they are homogeneous.

The cushioning zone 9 embraces the edge portion of the steel band 5, extending a slight distance over the opposite sides or faces of the band. In practice, the extent to which the cushioning zone reaches back over the sides or faces of the band, is in the neighborhood of ten-thousandths of an inch (.010"). The cushioning zone also extends above or beyond the edge of the steel band a distance of approximately ten-thousandths of an inch (.010"). Consequently, the cushioning zone 9 provides an effective barrier between the diamond particles 6 and the spring tempered steel band 5.

Since the electro-deposited bead 7 extends beyond the opposite sides or faces of the blade or band 5, and the diamond particles 6 cover the full width of the top surface 11 of the cushioning zone, it follows that the cutting edge thus provided is wider than the band thickness, so that, in use, the leading edge of the blade cuts a kerf which is wide enough to prevent binding of the blade in the work.

Inasmuch as the bead 7 is formed on the edge of the blade by electrolytic deposition, which of course involves immersing the blade in electrolyte, all surfaces of the blade—with the exception of its marginal edge portion on which the bead 7 is to be formed, must be masked and protected against contact with the electrolyte. This can be done in many ways.

With the blade properly masked, it is immersed in an electroplating bath. Upon such immersion, nickel cobalt is electro-deposited onto the exposed marginal edge portion of the band, to form the cushioning zone 9 of the bead. When the cushioning zone has been built up to the desired thickness, which as noted hereinbefore should be somewhere in the neighborhood of ten-thousandths of an inch (.010″), the diamond grit or bort 6 is sprinkled, or otherwise deposited on the top surface 11 of the cushioning zone, which in practice takes a slightly crowned shape.

Electroplating is then resumed and, as a result, the outer layer or zone 8 of the bead is formed and, as it forms, the diamond grit or particles are embedded therein, at least partially. If desired, the plating can continue until the diamonds are entirely covered, since during use of the saw blade, any nickel cobalt covering the diamonds would wear away to expose the diamonds.

Preferably the process is performed with the blade in the form of a straight flat strip, fifteen to twenty feet (15′–20′) in length, and as will be readily understood, during the electroplating the nickel cobalt anode that is used is connected to one terminal of the power supply, while the blade is connected to the other terminal thereof.

While diamond bort is perhaps the best material to use for the abrasive cutting edge, other abrasives can be used, and the invention is to be understood as encompassing other materials for this purpose. Thus, for example, aluminum oxide, silicon carbide, tungsten carbide, and boron carbide could be used in place of diamond bort. In fact, aluminum oxide and silicon carbide were actually used with reasonably good results.

From the foregoing description, taken in connection with the accompanying drawing, it should be apparent to those skilled in this art that this invention provides an improved diamond-edged cutting tool or band saw blade. It should also be understood that such changes in the precise embodiment of the hereindisclosed invention may be made as come within the scope of the following claims.

What is claimed as our invention is:
1. An abrasive edged saw blade comprising:
   (A) a thin flat spring steel strip having substantially uniform thickness and at least one straight edge;
   (B) a bead of electrodeposited metal on said edge of the strip, said bead having
   (1) an inner cushioning portion which embraces the marginal portion of the strip at said edge thereof and has a top boundary that is wider than the thickness of the spring steel strip and is spaced from said edge of the strip; and
   (2) an outer portion which covers said boundary of the inner cushioning portion and extends across the full width thereof but does not cover the sides of the cushioning portion; and
   (C) abrasive grits embedded in said outer portion of the bead and confined to said outer portion so that no abrasive grits overlie the side faces of the spring steel strip.

2. The saw blade of claim 1, wherein the abrasive grits are diamond bort.

3. The saw blade of claim 2, wherein the electrodeposited bead is nickel.

References Cited in the file of this patent

UNITED STATES PATENTS

| | | |
|---|---|---|
| Re. 25,076 | Toulmin | Nov. 7, 1961 |
| 2,542,058 | Riedesel | Feb. 20, 1951 |
| 2,784,536 | Barron | Mar. 12, 1957 |
| 2,796,706 | Anderson | June 25, 1957 |
| 2,820,746 | Keeleric | Jan. 21, 1958 |
| 2,858,651 | Shaw et al. | Nov. 4, 1958 |
| 2,859,166 | Grigger | Nov. 4, 1958 |
| 2,876,086 | Raymond | Mar. 3, 1959 |
| 2,924,050 | Barron | Feb. 9, 1960 |
| 2,946,734 | Roy et al. | July 26, 1960 |
| 2,984,052 | Mueller | May 16, 1961 |
| 3,046,204 | Barron | July 24, 1962 |
| 3,069,816 | Pratt et al. | Dec. 25, 1962 |

FOREIGN PATENTS

| | | |
|---|---|---|
| 543,644 | Belgium | June 15, 1956 |

OTHER REFERENCES

Wintev: German application 1,132,479, printed June 28, 1962 (Kl. 80d8).